United States Patent [19]
Cox et al.

[11] Patent Number: 5,283,626
[45] Date of Patent: Feb. 1, 1994

[54] FIBER OPTIC GYROSCOPE BIAS MODULATION AMPLITUDE DETERMINATION WITH RESET MEANS

[75] Inventors: James B. Cox, Glendale; Ronald R. Johnson; Salar Navidi, both of Phoenix; Ernest S. Richards, Glendale, all of Ariz.

[73] Assignee: Honeywell Inc., Minneapolis, Minn.

[21] Appl. No.: 869,947

[22] Filed: Apr. 17, 1992

[51] Int. Cl.$^5$ .............................................. G01C 19/72
[52] U.S. Cl. ...................................................... 356/350
[58] Field of Search ......................................... 356/350

[56] References Cited

U.S. PATENT DOCUMENTS

| | | | |
|---|---|---|---|
| 4,765,739 | 8/1988 | Koizumi et al. | 356/350 |
| 4,796,993 | 1/1989 | Sonobe et al. | 356/350 |
| 4,883,358 | 11/1989 | Okada | 356/350 |
| 5,048,961 | 9/1991 | Okamoto | 356/350 |
| 5,196,904 | 3/1993 | Dane et al. | 356/350 |

OTHER PUBLICATIONS

"Direct Rotation-Rate Detection with a Fibre-Optic Gyro by Using Digital Data Processing", K. Bohm et al., *Electronics Letters*, vol. 19, Nov. 10, 1983, pp. 997–999.

*Primary Examiner*—Samuel A. Turner
*Assistant Examiner*—LaCharles Keesee
*Attorney, Agent, or Firm*—John G. Shudy, Jr.

[57] ABSTRACT

A bias modulation amplitude monitoring system for a rotation sensor having a pair of output signal component detectors to provide magnitudes of the corresponding frequency components in that signal which are used by a component relationship determination arrangement capable of adjusting the output signal to have a selected value in a range of values for a selected rate of rotation thereof, and to correct variations therein, and having a reset arrangement capable of resetting the system if the output signal indicates an unwanted phase modulation amplitude.

11 Claims, 8 Drawing Sheets

FIBER OPTIC GYROSCOPE BIAS MODULATION AMPLITUDE DETERMINATION WITH RESET MEANS

Reference is hereby made to an earlier filed co-pending application by P. Dane et al entitled "Fiber Optic Gyroscope" having Ser. No. 07/636,305. This co-pending application has been assigned to the same assignee as the present application.

BACKGROUND OF THE INVENTION

The present invention concerns fiber optic system phase modulators and, more particularly, to arrangements for accommodating such phase modulation of electromagnetic waves traveling therein in changing conditions.

Fiber optic gyroscopes are an attractive means with which to sense rotation of an object supporting such a gyroscope. Such gyroscopes can be made quite small and can still be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

A fiber optic gyroscope has a coiled optical fiber wound on a core and about the axis thereof around which rotation is to be sensed. The optical fiber is typical of a length of 100 to 2,000 meters, or so, and is part of a closed optical path in which an electromagnetic wave, or light wave, is introduced and split into a pair of such waves to propagate in opposite directions through the coil to both ultimately impinge on a photo-detector. Rotation about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e. the well-known Sagnac effect. The use of a coiled optical fiber is desirable because the amount of phase difference shift due to rotation, and so the output signal, depends on the length of the entire optical path through the coil traversed by the two electromagnetic waves travelling in opposed direction, and so a large phase difference can be obtained in the long optical fiber but in the relatively small volume taken by it as a result of being coiled.

The output current from the photodetector system photodiode, in response to the oppositely directed traveling electromagnetic waves impinging thereon after passing through the coiled optical fiber, follows a raised cosine function. That is, the output current depends on the cosine of the phase difference between these two waves. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two oppositely directed traveling electromagnetic waves is usually modulated by placing an optical phase modulator in the optical path on one side of the coiled optical fiber. As a result, one of these oppositely directed propagating waves passes through the modulator on the way into the coil while the other wave, traversing the coil in the opposite direction, passes through the modulator upon exiting the coil.

In addition, a phase-sensitive detector serving as part of a demodulator system is provided to receive a signal representing the photodetector output current. Both the phase modulator and the phase-sensitive detector can be operated by a sinusoidal signal generator at the so-called "proper" frequency to reduce or eliminate modulator induced amplitude modulation, but other waveform types of the same fundamental frequency can be used. Other frequencies can be used, and often are, to reduce the frequency level to a more manageable value.

The resulting signal output of the phase-sensitive detector follows a sine function, i.e. the output signal depends on the sine of the phase difference between the two electromagnetic waves impinging on the photodiode, primarily the phase shift due to rotation about the axis of the coil in the absence of occurrence of other significant but unwanted phase shifts. A sine function is an odd function having its maximum rate of change at zero phase shift, and so changes algebraic sign on either side of zero phase shift. Hence, the phase-sensitive detector signal can provide an indication of which direction a rotation is occurring about the axis of the coil, and can provide the maximum rate of change of signal value as a function of the rotation rate near a zero rotation rate, i.e. the detector has its maximum sensitivity for phase shifts near zero so that its output signal is quite sensitive to low rotation rates. This is possible, of course, only if phase shifts due to other sources, that is, errors, are sufficiently small. In addition, this output signal in these circumstances is very close to being linear at relatively low rotation rates. Such characteristics for the output signal of the phase-sensitive detector are a substantial improvement over the characteristics of the output current of the photodetector.

An example of such a system from the prior art is shown in FIG. 1. The optical portion of the system contains several features along the optical paths to assure that this system is reciprocal, i.e. that substantially identical optical paths occur for each of the oppositely directed propagating electromagnetic waves except for the specific introductions of non-reciprocal phase difference shifts, as will be described below. The coiled optical fiber forms a coil, 10, about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity as well as the introduction of non-reciprocal phase shifts as is indicated to be done below.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e. the slower propagation axis, or the low index axis is chosen for propagating the electromagnetic waves depending on the other optical components in the system. In the present system, the slow axis has been chosen in view of the optical components used therein.

The electromagnetic waves which propagate in opposite directions through coil 10 are provided from an electromagnetic wave source, or light source, 11, in FIG. 1. This source is typically a laser diode which provides electromagnetic waves, typically in the near-infrared part of the spectrum, with a typical wavelength of 830 nm. Source 11 must have a short coherence length for emitted light to reduce the phase shift difference errors between these waves due to Rayleigh and Fresnel scattering at scattering sites in coil 10. Because of the nonlinear Kerr effect in coil 10, different intensities in the two counter propagating waves can lead to different phase shifts therebetween. This situation can be overcome also by use of a short coherence length source for source 11 which leads to modal phase shift canceling.

Between laser diode 11 and fiber optic coil 10 there is shown an optical path arrangement in FIG. 1 formed by the extension of the ends of the optical fiber forming coil 10 to some optical coupling components which separate the overall optical path into several optical path portions. A portion of the same kind of polarization-maintaining optical fiber as in coil 10 is positioned against laser diode 11 at a point of optimum light emission therefrom, a point from which it extends to a first optical directional coupler, 12.

Optical directional coupler 12 has light transmission media therein which extend between four ports, two on each end of that media, and which are shown on each end of coupler 12 in FIG. 1. One of these ports has the optical fiber extending from laser diode 11 positioned thereagainst. At the other port on the sense end of the optical directional coupler 12 there is shown a further optical fiber positioned thereagainst which extends to be positioned against a photodiode, 13, which is electrically connected to a photodetection system, 14.

Photodiode 13 detects electromagnetic waves, or light waves, impinging thereon from the portion of the optical fiber positioned thereagainst and provides a photo current in response. This photocurrent, as indicated above, in the case of two nearly coherent light waves impinging thereon, follows a cosine function in providing a photocurrent output which depends on the cosine of the phase difference between such a pair of substantially coherent light waves. This photovoltaic device will operate into a very low impedance to provide the photo current which is a linear function of the impinging radiation, and may typically be a p-i-n photodiode.

Optical directional coupler 12 has another optical fiber against a port at the other end thereof which extends to a polarizer, 15. At the other port on that same side of coupler 12 there is a non-reflective termination arrangement, 16, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no light is transmitted to the port which is on the same end of coupler 12 as is the incoming light port.

Polarizer 15 is used because, even in a single spatial mode fiber, two polarization modes are possible in light passing through the fiber. Thus, polarizer 15 is provided for the purpose of passing one of these polarization modes through the optical fiber, along the slow axis thereof as indicated above, while blocking the other. Polarizer 15, however, does not entirely block light in the one state of polarization that it is intended to block. Again, this leads to a small non-reciprocity between two oppositely directed traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Polarizer 15 has a port on either end thereof with the light transmission medium contained therein positioned therebetween. Positioned against the port on the end thereof opposite that connected to optical directional coupler 12 is another optical fiber portion which extends to a further optical bidirectional coupler, 17, which has the same light transmission properties as does coupler 12.

The port on the same end of coupler 17 from which a port is coupled to polarizer 15 again is connected to a non-reflective termination arrangement, 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber 10. Between coil 10 and coupler 17, on the side of coil 10 opposite the directly connected side thereof, is provided an optical phase modulator, 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in light transmitted therethrough by changing the index of refraction of the transmission medium, or transmission media, therein to thereby change the optical path length. Such electrical signals are supplied to modulator 19 by a bias modulation signal generator, 20, providing a sinusoidal voltage output signal at a modulation frequency $f_g$ that is equal to $C_1 \sin(\omega_g t)$ where $\omega_g$ is the radian frequency equivalent of the modulation frequency $f_g$. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source through the optical fiber portion to optical directional coupler 12. Some of that light entering coupler 12 from source 11 is lost in non-reflecting terminating arrangement 16 coupled to a port on the opposite end thereof, but the rest of that light is transmitted through polarizer 15 to optical directional coupler 17.

Coupler 17 serves as a beam-splitting apparatus in which the light entering the port thereof, received from polarizer 15, splits approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning light is lost in non-reflective arrangement 18 connected to the other port on the polarizer 15 connection end of coupler 17, but the rest of that light passes through the other port of coupler 17 to polarizer 15 and to coupler 12 where a portion of it is transmitted to photodiode 13. The other part of the light passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photocurrent, $i_{PD13}$, proportional to the intensity of the two electromagnetic or light waves impinging thereon, and is therefore expected to follow the cosine of the phase difference between these two waves impinging on that diode as given by the following equation:

$$i_{PD13} = \frac{I_0}{2}[1 + \cos(\phi_R + \phi_m\cos\omega_g t)]$$

This is because the current depends on the resulting optical intensity of the two substantially coherent waves incident on photodiode 13, an intensity which will vary from a peak value of $I_0$ to a smaller value depending on how much constructive or destructive interference occurs between the two waves. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with an amplitude value of $\phi_m$ and which varies as $\cos(\omega_g t)$.

Optical phase modulator 19 is of the kind described above and is used in conjunction with a phase-sensitive detector as part of a demodulation system for converting the output signal of photodetection system 14, following a cosine function as indicated above, to a signal following a sine function. Following such a sine function provides in that output signal, as indicated above, information both as to the rate of rotation and the direction of that rotation about the axis of coil 10.

Thus, the output signal from photodetection system 14, including photodiode 13, is provided through an amplifier, 21, where it is amplified and passed through a filter, 22, to such a phase sensitive detector means, 23. Phase-sensitive detector 23, serving as part of a phase demodulation system, is a well known device. Such a phase-sensitive detector senses a change in the first harmonic, or fundamental frequency, of modulation signal generator 20 to provide an indication of the relative phase of the electromagnetic waves impinging on photodiode 13. This information is provided by phase-sensitive detector 23 in an output signal following a sine function, that is, this output signal follows the sine of the phase difference between the two electromagnetic waves impinging on photodiode 13.

Bias modulator signal generator 20, in modulating the light in the optical path at the frequency $f_g$ described above, also generates harmonic components in photodetection system 14. Filter 22 is a bandpass filter which is to pass the modulation frequency component of the output signal of photodetector 14, i.e. the first harmonic, after its amplification by amplifier 21.

In operation, the phase difference changes in the two oppositely directed propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves. The amplitude scaling factor of the modulation frequency component of the output signal of photodetection system 14, appearing at the output of filter 22, is expected to be set by the sine of this phase difference modified further only by the factors of a) the amplitude value of the phase modulation of these waves due to modulator 19 and generator 20, and b) a constant representing the various gains through the system. Then, the periodic effects of this sinusoidal modulation due to generator 20 and modulator 19 in this signal component are expected to be removed by demodulation in the system containing phase-sensitive detector 23 leaving a demodulator system (detector) output signal depending on just the amplitude scaling factor thereof.

Thus, the voltage at the output of amplifier 21 will typically appear as:

$$v_{21-out} = k\{1+\cos[\phi_R+\phi_m\cos(\omega_g t+\theta)]\}$$

The constant k represents the gains through the system to the output of amplifier 21. The symbol, $\theta$, represents additional phase delay in the output signal of amplifier 21 with respect to the phase of the signal provided by generator 20. Some of this phase shift will be introduced in photodetection system 14, and some will be due from other sources such as a phase shift across modulator 19 between the phase of the signals supplied by generator 20 and the response of modulator 19 in having the index of refraction of the media therein, or its length, correspondingly change. The other symbols used in the preceding equation have the same meaning as they did in the first equation above.

The foregoing equation can be expanded in a Bessel series expansion to give the following:

$$v_{21-out} = k[1 + J_0(\phi_m)\cos\phi_R] - 2kJ_1(\phi_m)\sin\phi_R\cos(\omega_g t + \theta) -$$
$$2kJ_2(\phi_m)\cos\phi_R\cos2(\omega_g t + \theta) + 2kJ_3(\phi_m)\sin\phi_R\cos3(\omega_g t + \theta) +$$
$$\sum_{n=2}^{\infty}[(-1)^n 2kJ_{2n}(\phi_m)\cos\phi_R\cos2n(\omega t + \theta) +$$
$$(-1)^n 2kJ_{2n+1}(\phi_m)\sin\phi_R\cos(2n + 1)(\omega_g t + \theta)]$$

This signal at the output of amplifier 21 is applied to the input of filter 22.

Filter 22, as indicated above, passes primarily the first harmonic from the last equation, i.e. the modulation frequency component. As a result, the output signal of filter 22 can be written as follows:

$$v_{22-out} = -2kJ_1(\phi_m)\sin\phi_R\cos(\omega_g t + \theta + \phi_1)$$

The further phase delay term appearing, $\Psi_1$, is the additional phase shift in the first harmonic term added as a result of passing through filter 22. This added phase shift is expected to be substantially constant and a known characteristic of filter 22.

The signal from filter 22 is then applied to phase-sensitive detector 23, as is the signal from bias modulator generator 20, the latter again being equal to $C_1\sin(\omega_g t)$ where $\omega_g$ is the radian frequency equivalent of the modulation frequency $f_g$. Assuming that a phase shift equal to $\theta + \Psi_1$ can be added by phase-sensitive detector 23 to its output signal, the output of that detector will then be the following:

$$v_{23-out} = k' J_1(\phi_m)\sin\phi_R$$

The constant $k'$ accounts for the system gains through phase-sensitive detector 23.

As can be seen from this last equation, the output of phase-sensitive detector 23 depends on the amplitude $\phi_m$ supplied by bias modulator 19 as operated by bias modulation generator 20. Hence, the amplitude of the signals supplied by bias modulation generator 20 can be used to set the value of the signal at the output of phase-sensitive detector 23 for a given rotation rate of coil 10 about its axis, i.e. set the scale factor for the gyroscope at least within a range of possible values therefor.

There are several reasons why an operator of a fiber optic gyroscope would like to be able to set the amplitude of the bias phase modulation in the system of FIG. 1 to a selected value. That amplitude affects the distortion which results in the optical waves traveling in the optical fiber, as well as the noise effectively generated by bias modulation generator 20 through its inducing of signals in other parts of the electronic portion of the system. In addition, of course, the signal strength at the photodetector output is obviously determined within limits by the phase modulation amplitude.

Furthermore, once the phase modulation amplitude is chosen, there is strong need to maintain that value chosen for the scale factor as a constant. The scale factor of the fiber optic gyroscope is what will be used by the systems which receive the rotation sensor output signal to determine what rotation rate is being represented by that signal. Thus, unanticipated changes in that scale factor value will lead to errors in the value of the angular rotation information being supplied to these other systems. In those fiber optic gyroscopes which have relatively undemanding scale factor selection and stability requirements, selecting, and then maintaining, a stable amplitude of the signal supplied by bias modulator generator 20 would be sufficient. However, fiber optic gyroscopes are very often required to meet much more demanding requirements with respect to selecting scale factor values, and with respect to stability insofar as maintaining the scale factor selected. Also, there could occur a sufficiently large disturbance in the phase modulation amplitude such that the scale factor selecting and stabilizing arrangement results in a scale factor having an undesired value. Thus, there is desired a scale factor selecting and stabilizing arrangement which will permit the selection of scale factors from a broad continuous range and the stable maintenance thereof once selected.

SUMMARY OF THE INVENTION

The present invention provides for a rotation sensor, having at least in part the configuration described above, to have additionally a bias modulation amplitude monitoring system with first and second photodetector output signal component determination arrangements that can provide the magnitudes of first and second frequency components in the photodetector output signal, and a component relationship determination arrangement capable of adjusting the photodetector output signal so that the rotation sensor has a selected value in a range of values for a selected rate of its rotation, and so that deviations therein due to any phase modulation amplitude variations are corrected, based on the relative values of these first and second frequency co magnitudes. This component relationship d arrangement can have a signal processor therein which receives the signals representing said first and second frequency component magnitudes, and receives the photodetector output signal, to provide a rotation sensor output signal based on the photodetector output signal after adjustment thereof based in turn on the relative magnitudes of the first and second frequency component magnitudes. Alternatively, the component relationship determination arrangement can be connected to the optical modulator in a manner so as to be able to control its amplitude, this component relationship determination arrangement in this situation being capable of providing a signal at its output based on the relative said first and second frequency component magnitudes to control the optical phase modulator. A reset arrangement is provided capable of resetting the component relationship determination arrangement if a sufficiently large disturbance occurs in the phase modulation amplitude.

DETAILED DESCRIPTION OF THE PREFERRED EMBODIMENTS

Figure 1:
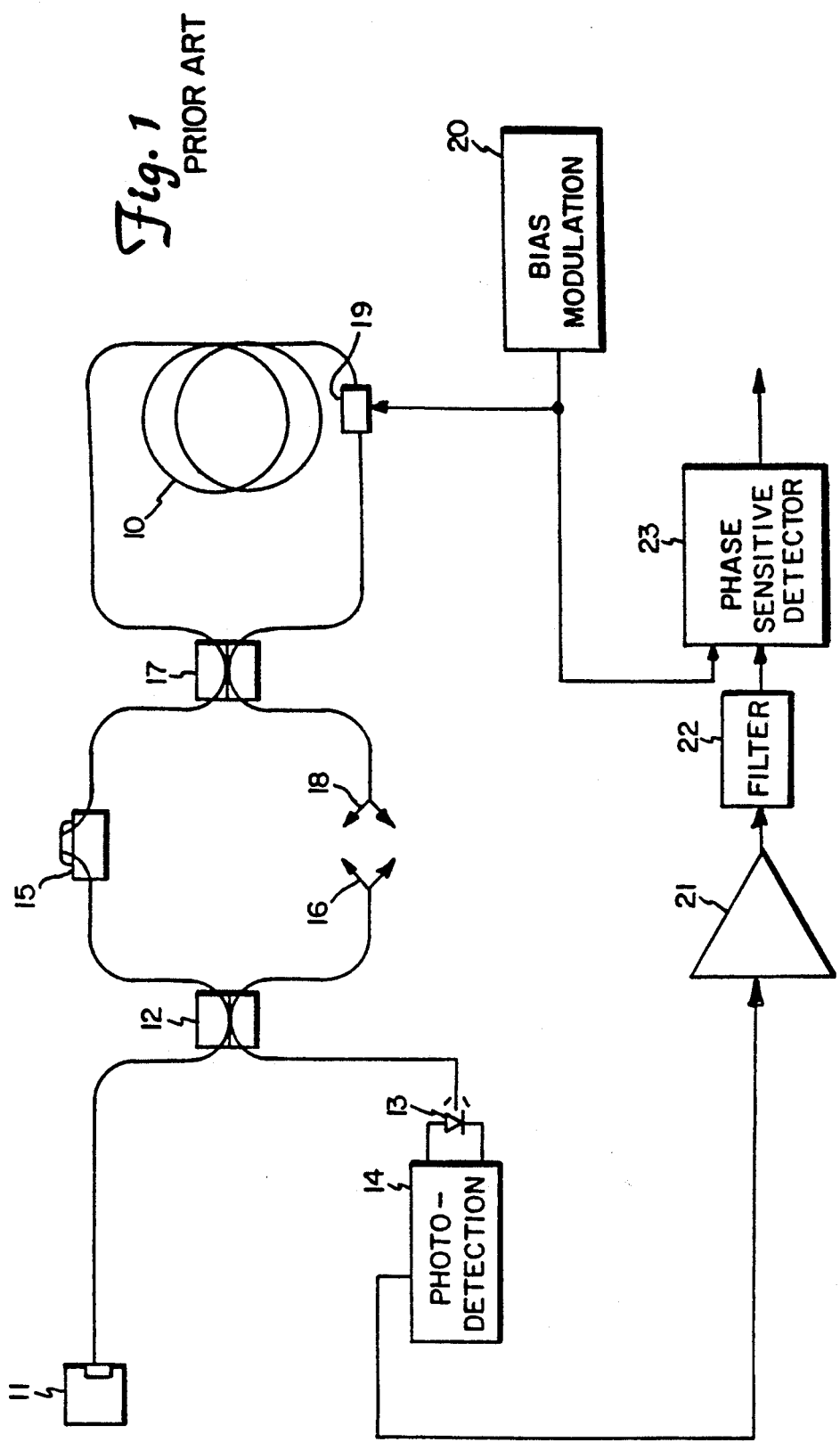
FIG. 1 shows a mixed block and circuit schematic diagram of a system known in the prior art.
Figure 2:
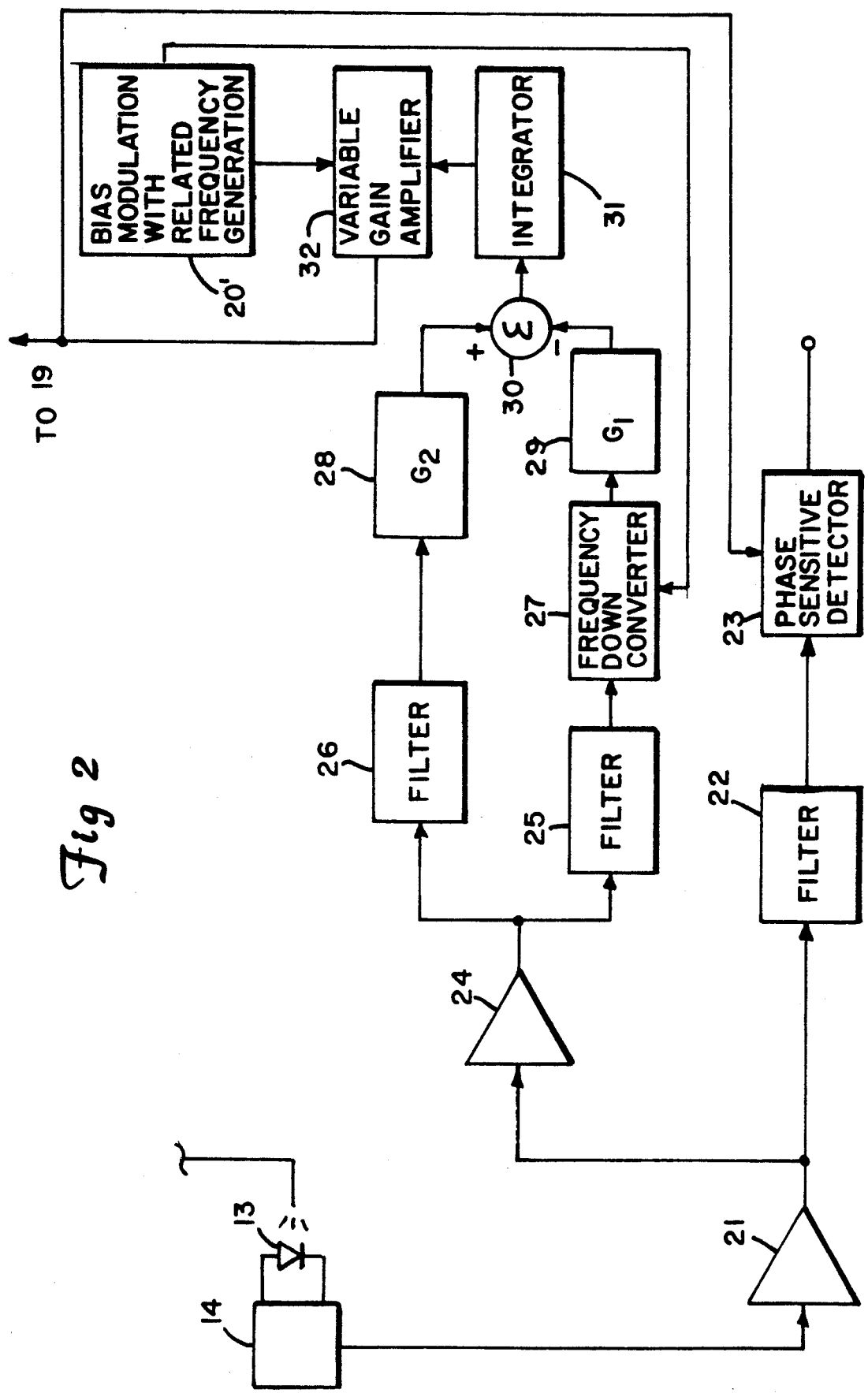
FIG. 2, shows a mixed block and circuit schematic diagram embodying a portion of the present invention which can be substituted for a portion of the diagram of FIG. 1.

Because of the difficulty in relying on the output amplitude setting of bias modulator signal generator 20 to select and maintain an accurate scale factor for the fiber optic gyroscope of FIG. 1, an alternative system embodying the present invention is shown in FIG. 2 for this purpose. FIG. 2 shows a feedback arrangement for controlling the amplitude of the signal used to operate optical phase modulator 19. The system of FIG. 2 permits not only maintaining accurately the scale factor relating the signal at the output of phase sensitive detector 23 to the rotation rate about the axis of coiled optical fiber 10, but also permits selecting the value of the scale factor to be so maintained from a substantial range of values. The same designations are used in FIG. 2 as were used in FIG. 1 for similar components there.

The input signal for the new portion of the feedback loop is the output of amplifier 21, given above as the signal $v_{21-out}$ in both closed form and in expanded form. This signal is applied to a further amplifier, 24, serving as a buffer to avoid any loading of amplifier 21. In providing this service, amplifier 24 does not alter in any significant way the signal provided at the output of amplifier 21.

The signal at the output of amplifier 24 is concurrently supplied to two filters, 25 and 26. Filter 25 is a high-pass filter which blocks passage of that component of the photodetector output signal from photodetection system 14, after passing through amplifiers 21 and 24, which does not depend on the frequency $\omega_g$ of bias modulation signal generator 20. That is, the lowest frequency content signal component of the signal at the output of amplifier 24, represented by the first term in the above expansion for $v_{21-out}$, is blocked by filter 25.

Rather than a high-pass filter, filter 25 can be a bandpass filter having a bandwidth which goes substantially beyond the frequency value of the signal component chosen from among the remaining signal components in the output signal of amplifier 24 to be used in the following portions of the system of FIG. 2. Further, if the chosen harmonic component is large with respect to other harmonic components, filter 25 may not be necessary in some circumstances.

The system in FIG. 2 will be described on the assumption that the second harmonic component of the output signal of photodetection system 14, as represented at the output of amplifier 24, has been chosen for such use but other even harmonic components could alternatively be used such the fourth harmonic. In any of these even harmonic situations, the upper cutoff frequency of filter 25, if a bandpass filter, must be substantially in excess of the harmonic component chosen to be subsequently used to avoid causing any undue phase delay problems with respect thereto. The phase of such a frequency component must not be delayed significantly through filter 25 if required frequency conversion of that component to obtain a signal representing its amplitude is to be successfully performed.

Filter 26, on the other hand, is a low-pass filter which is used to extract the component of the photodetector output signal provided by photodetection system 14, as it appears at the output of amplifier 24, which does not have any dependence on the frequency $\omega_g$ of the bias modulation signal generator, i.e. the signal component having the lowest frequency content. This is, as previously indicated, the first term in the above expansion for the output voltage signal of amplifier 21, after amplification by amplifier 24, and can be written as follows:

$$v_{26-out} = k_A[1 + J_o(\phi_m)\cos\phi_R]\cos\theta$$

The constant $k_A$ represents the combined gains of amplifier 21 and 24 a well as the intensity of the electromagnetic waves incident on photodetector 13. The cutoff frequency for low-pass filter 26 is chosen to be of relatively low value since this output signal will typically have a low frequency content and be a constant in the absence of any changing angular rotation rate of the gyroscope. Typical values of this cutoff frequency would be between 5 and 100 Hz. The phase delay through the filter will make no significant difference, and so no special effort is required to control the phase delay added by filter 26. This being so, that phase delay is not represented in the foregoing equation.

The output of high-pass, or bandpass, filter 25 is provided to a frequency down converter, 27. Frequency down converter 27 also receives a reference signal of a frequency equal to that of the even harmonic component of the output signal of amplifier 24 chosen to be used in the remaining portions of the system, this reference signal of even harmonic frequency being based on the frequency of the bias modulation signal generator. Since the second harmonic is being used in the present description, a signal with frequency $2\omega_g$ is supplied by the bias modulation signal generator to frequency down converter 27. Thus, this signal generator is redesignated 20' in FIG. 2 since it now supplies not only the bias modulation signal at frequency $\omega_g$, but also the second harmonic of that signal at frequency $2\omega_g$. The resulting signal at the output of frequency down converter 27 can be written in the following manner:

$$v_{27-out} = k_D k_A J_2(\phi_m)\cos\theta\cos\phi_R$$

The constant $k_A$ has the same meaning here as it did above. The constant $k_D$ represents the amplitude value adjustment occurring through frequency down converter 27.

These last two signals, $v_{26-out}$ and $v_{27-out}$, representing the amplitudes of selected frequency components of the amplified output signal of photodetector 13 obtained from photodetection system 14, are each scaled by a corresponding selected multiplicative constant before being subtracted one from the other. Thus, the signal resulting from the output of high-pass, or bandpass, filter 25 after being converted by frequency down converter 27, $v_{27-out}$, is multiplied by a selectable multiplicative constant $G_1$, and the signal resulting from the low-pass filter 26 is multiplied by the selectable constant $G_2$.

This latter multiplication is represented by a multiplicative gain block, 28, in FIG. 2 with the constant $G_2$ shown therein. Such a multiplication yields the signal $$v_{28-out} = G_2 k_A[1 + J_o(\phi_m)\cos\phi_R]\cos\theta$$

The former multiplication is represented in FIG. 2 by a further multiplicative gain block, 29, again with the multiplicative constant $G_1$ shown therein. This results in a signal at the output of that block of the form $$v_{29-out} = G_1 k_D k_A J_2(\phi_m)\cos\theta\cos\phi_R$$

This latter signal then has subtracted from it the preceding signal to provide the following output signal at the output of an algebraic summer, 30:

$$\begin{aligned}v_{30-out} &= v_{28-out} - v_{29-out} \\ &= k_A\{G_2[1 + J_o(\phi_m)\cos\phi_R] - G_1 k_D J_2(\phi_m)\cos\phi_R\}\cos\theta\end{aligned}$$

This, difference signal is then integrated over time by an integrator represented in FIG. 2 by a block, 31. The result of this integration is applied to a variable gain amplifier represented in FIG. 2 by a further block, 32. The gain setting of variable gain amplifier 32 determines the amplitude of the bias modulation signal at the bias modulation frequency $\omega_g$ supplied from bias modulation signal generator 20' to optical phase modulator 19. The resulting phase modulation of the electromagnetic waves in the optical system including coiled optical fiber 10 of FIG. 1 is given effect in the output signal of photodetector 13 by these waves impinging thereon to close the feedback loop.

So long as any net signal is provided to integrator 31, that integrator will integrate the signal over time causing a continually changing value at its output. Thus, once a value $\phi_{mo}$ has been selected for the amplitude value $\phi_m$ of the bias modulation phase shift amplitude and the system of FIG. 2 settled in a steady state about that value, the signal value at the output of integrator 31 should be unchanging to thereby cause variable gain amplifier 32 to present at its output a signal, $c_1'\sin(\omega_g t)$, which is a suitably multiplied version of the output signal $c_1\sin(\omega_g t)$ of bias modulation signal generator 20', so as to force optical phase modulator 19 to provide just that value of the bias phase modulation phase shift amplitude. Thus, this last difference signal must be equal to zero when the bias phase modulation phase shift amplitude $\phi_m$ has a selected value of $\phi_{mo}$, or $$v_{30-OUT}=0=k_A\{G_2[1+J_o(\phi_{mo})\cos\phi_R]-G_1k_DJ_2(\phi_{mo})\cos\phi_R\}\cos\theta$$

yielding $$\frac{J_2(\phi_{mo})\cos\phi_R}{1+J_o(\phi_{mo})\cos\phi_R} = \frac{G_2}{k_DG_1}$$

This last equation, then, is the condition which must be met to select a particular value, $\phi_{mo}$, for the bias phase modulation phase shift amplitude $\phi_m$. Clearly, the value to be selected for the bias phase modulation phase shift amplitude is chosen by the choice of values selected for the constants $G_1$ and $G_2$ at least for sufficiently slow rotation rates reflected in a sufficiently small corresponding Sagnac phase shift $\phi_R$.

However, disturbances in the value of bias phase modulation amplitude $\phi_m$ may occur during operation of the system forcing the feedback loop of FIG. 2 away from steady-state operation because of temperature changes, component aging or the like. Such a disturbance in the value of the bias phase modulation phase shift amplitude $\phi_m$ from its desired value $\phi_{mo}$ can be represented as a small increment or decrement therefrom, or $$\phi_m=\phi_{mo}+\delta(t)$$

where $\delta(t)$ represents the small change due to the disturbance from the selected value of the bias phase modulation phase shift amplitude $\phi_{mo}$.

The occurrence of such a disturbance in the value of the bias phase modulation phase shift amplitude from its selected value of $\phi_{mo}$ results in the output signal voltage of summer 30 no longer being zero, and its resulting value can be written as follows:

$$v_{30-out}=k_A\{G_2[1+J_o(\phi_{mo}+\delta)\cos\phi_R]-G_1k_DJ_2(\phi_{mo}+\delta)\cos\phi_R\}\cos\theta$$

If $\delta$ is sufficiently small, this last equation may be represented by a linear approximation as follows:

$$v_{30-out} \approx k_A\cos\theta\bigg(-G_2J_1(\phi_{mo})\cos\phi_R - \frac{G_1k_D}{2}[J_1(\phi_{mo})-J_3(\phi_{mo})]\cos\phi_R\bigg)\delta$$

The constant $G_2$ can be eliminated in the last equation by substituting for it the equation representing the condition to be met for choosing the value of the bias phase modulation phase shift amplitude given above, or $$v_{30-out} \approx k_AG_1k_D\cos\theta\cos\phi_R\bigg[\frac{J_3(\phi_{mo})-J_1(\phi_{mo})}{2} - \frac{J_1(\phi_{mo})J_2(\phi_{mo})}{1+J_o(\phi_{mo})\cos\phi_R}\cos\phi_R\bigg]\delta$$

This signal is then integrated by integrator 31 to provide the following output signal therefrom to control the gain of variable gain amplifier 32, this signal being $$v_{31-out} = k_I\int^t v_{30-OUT}dt \approx$$

$$k_Ik_AG_1k_D\cos\theta\cos\phi_R\bigg[\frac{J_3(\phi_{mo})-J_1(\phi_{mo})}{2} - \frac{J_1(\phi_{mo})J_2(\phi_{mo})}{1+J_o(\phi_{mo})\cos\phi_R}\cos\phi_R\bigg]\int^t\delta(t)dt$$

If a constant K is defined as $$K \triangleq k_Ik_AG_1k_D\cos\theta$$

the last equation can be simplified, assuming sufficiently low rotation rates so that $\cos\phi_R$ approximately equals 1, to give $$v_{31-out} \approx$$

$$K\bigg[\frac{J_3(\phi_{mo})-J_1(\phi_{mo})}{2} - \frac{J_1(\phi_{mo})J_2(\phi_{mo})}{1+J_o(\phi_{mo})}\bigg]\int^t\delta(t)dt$$

or $$= K'(\phi_m, \phi_R)\int^t\delta(t)dt$$

The last defined equation has a term therein K' dependent on the phase modulation phase shift amplitude $\phi_m$ and the Sagnac phase change induced by the rotation of the sensor $\phi_R$ which, if sufficiently small, will leave this factor approximately a constant having a value depending on the value $\phi_{mo}$ selected for the bias phase modulation phase shift amplitude of the system by the choice of values for the constants $G_1$ and $G_2$.

Figure 3:
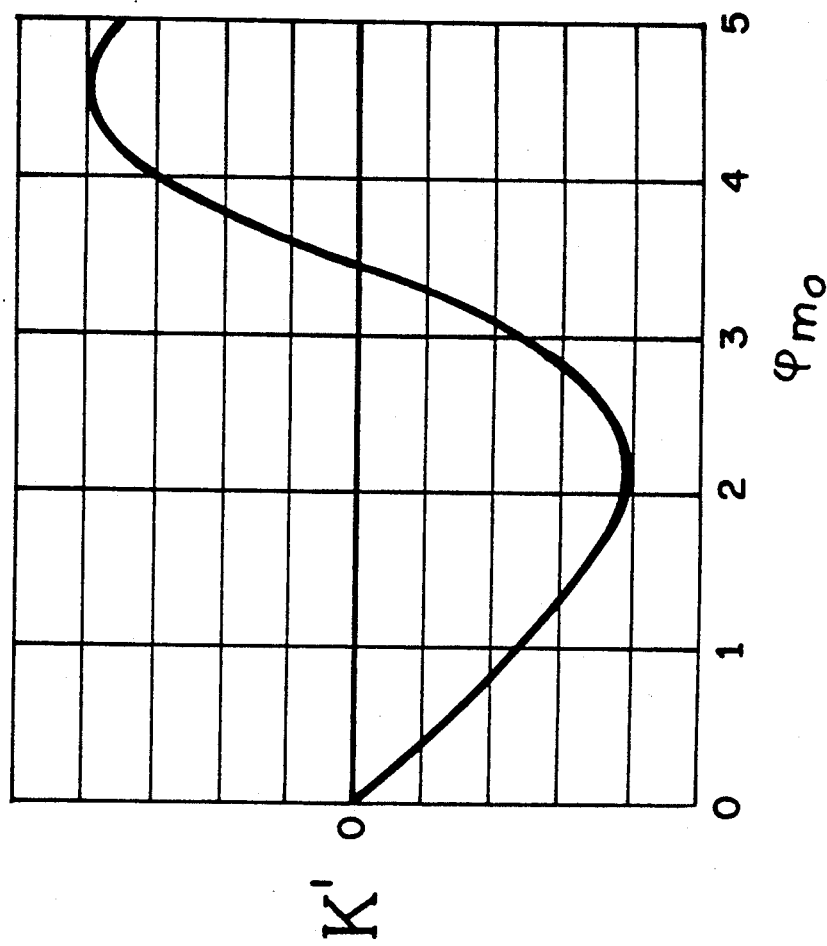
FIG. 3 shows a graph representing the behavior of a parameter characterizing the present invention.

A graph of the factor K' as a function of $\phi_{mo}$ is shown in FIG. 3 (for $\cos\phi_R$ about 1, otherwise there would be a family curve in FIG. 3 for different values of $\phi_R$). Since the signal $v_{31-out}$ at the output of the integrator is the signal which controls the feedback that determines the change in the value of $\phi_m$ through controlling, through variable gain amplifier 32, the amplitude of the signal from bias modulation generator 20' applied to phase optical modulator 19, the graph shows that the feedback remains negative in the feedback loop for values of $\phi_m$ which are less than approximately 3.4 to 3.5 radians. Thus, the feedback loop will be stable and act to damp out such disturbances for such values of $\phi_m$ in the bias phase modulation phase shift amplitude between the waves propagating in opposite directions in fiber optic coil 10 so long as the rotation rates of the sensor about the axis of that coil are sufficiently low.

This damping of a disturbance can be shown by the effect of the signal at the output of integrator 31 upon variable gain amplifier 32 and optical phase modulator 19. Thus, assuming that bias modulation generator 20' provides a substantially constant amplitude in its output signal $v_{32-out}$, the output signal of variable gain amplifier 32 is $$v_{32-out} = (c_2 + c_3 v_{31-out}) v_{20'-out}$$

This signal can be rewritten in another form based on there being a signal provided by variable gain amplifier 32 which has a maximum amplitude, $V_{VGA_o}$, corresponding to there being no disturbance in the value of the bias phase modulation phase shift amplitude, i.e. that this latter amplitude is at its desired value of $\phi_{mo}$, with an increment or a decrement due to the disturbance which, for simplicity, will again be termed $v_{31-out}$ thereby ignoring its steady state component, to provide the following alternative representation of variable gain amplifier 32

$$v_{32-out} = V_{VGA_o} + k_{VGA} v_{31-out}$$

The constant $k_{VGA}$ represents as a constant the gain effect of variable gain amplifier 32. Optical phase modulator 19 will also be assumed to be linear so that the output phase shift it provides can be represented as $$\phi_m = k_{OPM} v_{32-out}$$

The constant $k_{OPM}$ represents as a constant the gain effect of optical phase modulator 19.

As a result, the value of the optical phase modulator phase shift amplitude, in a form reflecting a disturbance of magnitude $\delta$, can be related to the signal at the output of integrator 31. Thus, $$\phi_m = \phi_{mo} + \delta(t) = k_{OPM} v_{32-out} =$$
$$k_{OPM} V_{VGA_o} + k_{OPM} k_{VGA} v_{31-out} =$$
$$k_{OPM} V_{VGA_o} + k_{OPM} k_{VGA} K' \int_{-}^{t} \delta(t) dt$$

using the value for the output signal $v_{31-out}$ of integrator 31 found above. Differentiating this last equation with respect to time gives the following result:

$$\frac{d\delta(t)}{dt} = \frac{d(k_{OPM} V_{VGA_o})}{dt} + k_{OPM} k_{VGA} K' \delta(t)$$

The first term on the right of the equal sign will be taken to yield a zero value since any change in $k_{OPM} V_{VGA_o}$ will be taken to lead to the occurrence of the disturbance $\delta(t)$, and so represented by it. If that is done, and the disturbance is arbitrarily assumed to have occurred at time t=0, the following first order differential equation results $$\frac{d\delta(t)}{dt} = k_{OPM} k_{VGA} K' \delta(t)$$

which is easily solved to provide a solution of the following form:

$$\delta(t) = \delta_o e^{k_{OPM} k_{VGB} K' t}$$

As indicated above, K' is negative for $\phi_{mo}$ having a value less than approximately 3.4 to 3.5. Thus, the last equation shows that the disturbance will be damped out.

The output signal of the fiber optic gyroscope provided at the output of phase sensitive detector 23 was shown above as $$v_{32-out} = k' J_1(\phi_m) \cos\theta \sin\phi_R$$

which, in the presence of a disturbance $\delta(t)$, will be $$v_{23-out} = k' J_1(\phi_{mo} + \delta) \cos\theta \sin\phi_R$$

Again, for sufficiently small disturbances, at sufficiently low rotation rates, this can be approximated linearly to result in the following equation:

$$v_{23-out} \approx k' J_1(\phi_{mo}) \cos\theta \sin\phi_R +$$
$$k' \frac{J_o(\phi_{mo}) - J_2(\phi_{mo})}{2} \cos\theta \sin\phi_R [\delta(t)]$$

As can be seen, there is a resulting error in the scale factor of $$k' \frac{J_o(\phi_{mo}) - J_2(\phi_{mo})}{2} \cos\theta [\delta(t)]$$

Substituting the solution to the first order differential equation above shows that this scale factor error will also be damped out with the same time constant controlling the damping of the disturbance itself:

$$k' \frac{J_o(\phi_{mo}) - J_2(\phi_{mo})}{2} \cos\theta [\delta_o] e^{k_{OPM} k_{VGA} K' t}$$

Hence, a choice of a value for the bias phase modulation signal amplitude $\phi_{mo}$, which is sufficiently smaller than 3.4 to 3.5 radians and implemented through corresponding choices for the values of the constants G₁ and G₂, will, in the system of FIG. 2, be maintained against disturbances in the value of that choice for sufficiently low rotation rates of the fiber optic gyroscope about the axis of coiled optical fiber 10. If $\phi_{mo}$ must be of a larger value than 3.4 to 3.5 radians, an even harmonic greater than the second harmonic must be chosen from the photodetector signal provided by photodetection system 14 by filter 25 and frequency down converter 27, such as the fourth harmonic, for use in the system of FIG. 2.

For larger input rates $\phi_R$, the preceding analysis does not entirely hold. However, the requirement that $V_{30-out} = 0$ will still be met by the system of FIG. 2. In this situation, the amplitude $\phi_m$ will not stay at an initial selected value $\phi_m$ but will be driven predictably to another value in unique correspondence with $\phi_R$ representing the larger input rate. Thus, the stability of the scale factor of the system of FIG. 2, relating the system output signal to the input rate $\phi_R$, will not be significantly reduced.

Figure 4:
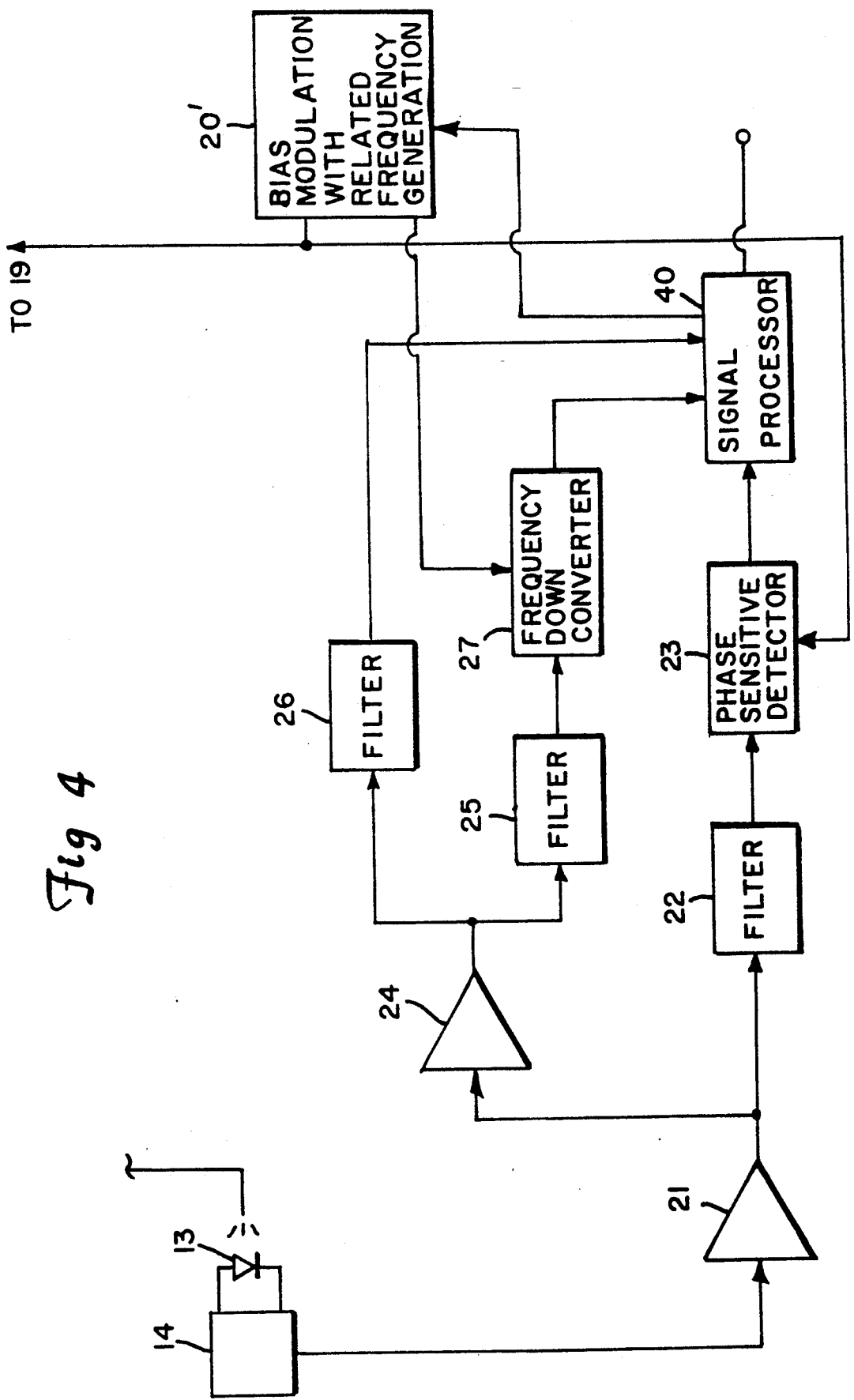
FIG. 4 shows a mixed block and circuit schematic diagram embodying a portion of the present invention which can be substituted for a portion of the diagram of FIG. 1.

As an alternative to the feedback arrangement of FIG. 2, the even harmonic chosen from the photodetector output signal provided by photodetection system 14, and the lowest frequency component of that signal, or the component closest to the zero frequency value, can be used to provide a basis for signal processing calculations to effectively select a scale factor, and to counter any disturbances in the fiber optic gyroscope system which would otherwise tend to alter the scale factor so chosen. Such a system is shown in FIG. 4 where the same designations are used there that are used in FIGS. 1 and 3 for similar components in each of these figures. Thus, the same equations govern the signals obtained at the outputs of filter 26 and frequency down converter 27 as are found for the similar signals in FIG. 2, or $$v_{26-out} = k_A[1 + J_0(\phi_m)\cos\phi_R]\cos\theta$$

and $$v_{27-out} = k_A k_D J_2(\phi_m)\cos\theta\cos\phi_R$$

Similarly, the same equation characterizes the output of phase sensitive detector 23 in the system of FIG. 4 as it did in FIG. 2, or $$v_{23-out} = k'J_1(\phi_m)\cos\theta\sin\phi_R$$

As can be seen in FIG. 4, all three of these signals are provided to a signal processor, 40. Such a signal processor can take many forms, perhaps the most straightforward of which would provide a corresponding analog-to-digital converter for each of these incoming signals, or multiplex them together through such converter, and transmit the conversion results to the microprocessor. Alternatively, selected ratios of these signals could be found while in their analog form, and those results submitted to one or more analog-to-digital converters to provide the conversion results to a microprocessor. Another alternative would be to use an existing signal processing integrated circuit chip from those which are currently commercially available.

In any event, one can see from the last three equations that there are three unknowns therein, $\phi_m$, $\phi_R$ and k' assuming that the constant characterizing the amplification by amplifiers 21 and 24 and the effective gain in the conversion in photodetection system 14 from current to voltage, $k_A$, the constant characterizing frequency down converter 27, $k_D$, and phase delay through the optical system $\theta$ are known (or removable in the case of the phase delay). Since there are three equations for these three unknowns, the values of these three unknowns can be extracted by signal processor 40 for values of $\phi_m$ less than about 3.4 to 3.5 radians from which signal processor 40 can provide an output representing the actual rate of rotation of the fiber optic gyroscope about the axis of its coiled optical fiber based on the value $\phi_R$. A nominal value for $\phi_m$, the value of the optical phase modulation amplitude, can be set by choosing the amplitude of the signal provided by bias modulation generator 20'.

The fiber optic gyroscopes of FIGS. 2 and 4 are open loop gyroscopes as opposed to closed loop gyroscopes in which the phase differences between the electromagnetic waves propagating in opposite directions are nulled in a feedback loop. However, the even harmonics remain present in the optical signals so that the system of FIGS. 2 and 4 could be used with closed loop gyroscopes should there be any reason found for doing so.

As previously described, the desired bias modulation phase shift amplitude, $\phi_{mo}$, is obtained by selecting values for G1 and G2. For each pair of values for G1 and G2, there exists more than one $\phi_{mo}$ that will satisfy the equation $$\frac{J_2(\phi_{mo})\cos\phi_R}{1 + J_0(\phi_{mo})\cos\phi_R} = \frac{G_2}{k_D G_1}.$$

However, for positive values of $G2/k_D G1$, there is only one solution to the above equation where $\phi_{mo}$ is less than $\pi$ radians, a value having a significance that will be indicated below. A possible problem in the system described above is that, for sufficiently large disturbances in the values of $\phi_m$ or $\phi_R$, the feedback arrangement of FIG. 2 can force the value of $\phi_m$ toward a solution $\phi_{mo}$ to the above equation that has a value greater than $\pi$. Therefore, an added protection for the bias modulation system to assure operation of that system at the intended value $\phi_{mo}$ for $\phi_m$ can be provided through the inclusion therein of a reset means. This reset means is to act to reset the bias phase modulation amplitude feedback control loop operating point if a disturbance in $\phi_m$ or $\phi_R$ forces the loop toward a stable operating point $\phi_{mo}$ which would have a value greater than $\pi$.

Figure 5:
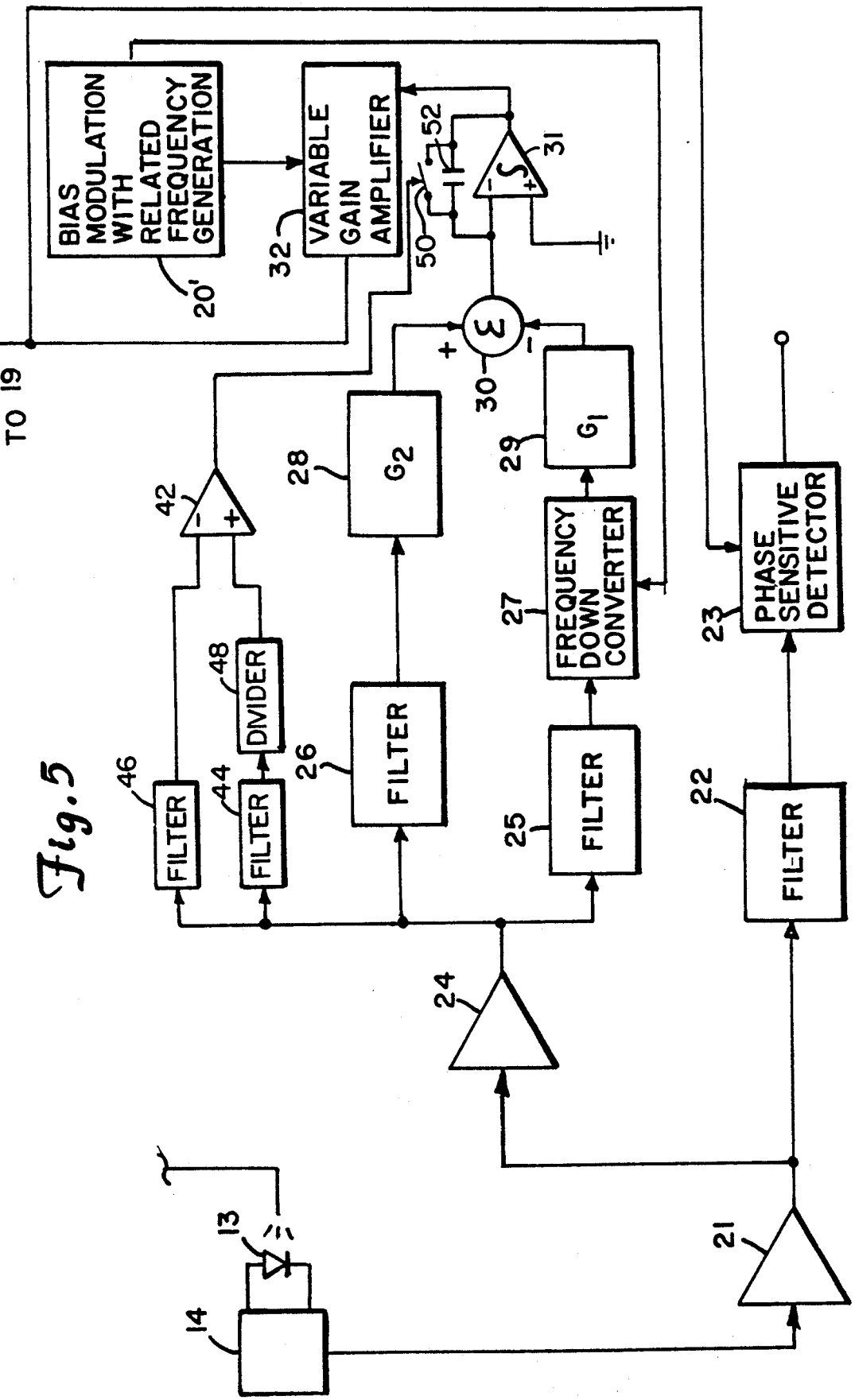
FIG. 5 shows a mixed block and circuit schematic diagram embodying the present invention which ca be substituted for a portion of the diagram of FIG. 1.

One suitable reset means, shown in FIG. 5 comprises a comparator, 42, electrical signal filters, 44 and 46, a resistive voltage divider, 48, and an analog switch, 50, this switch typically constructed using CMOS transistors. The same designations are used in FIG. 5 as were used in FIG. 2 for similar components.

The input signal for the reset means of the present invention is the voltage signal $v_{24-out}$ at the output of amplifier 24, a substantially proportional version of the output signal from photodetection system 14, which is concurrently supplied to filters 44 and 46. Filter 44 is a low-pass filter with a cutoff frequency value of 7 kHz, and is used to obtain a time averaged value of $v_{24-out}$ which does not have any significant dependence on the frequency $\omega_g$ of bias modulation signal generator 20'. The output signal of filter 44 is supplied to the input of voltage divider 48 which provides a reference level voltage of a selected value at its output. This reference level voltage is applied to the noninverting input of comparator 42.

Filter 46 is also a low-pass filter and is used as a high frequency noise filter primarily to remove digital switching noise. Filter 46 has a cutoff frequency value of 200 kHz which leaves present in its output signal frequency components at frequency $\omega_g$, its second and typically some higher harmonics. The output signal of filter 46 is applied to the inverting input of comparator 42.

As can be seen, both the inverting and noninverting inputs of comparator 42 are provided with input signals that are based on output signal $v_{24-out}$ of amplifier 24. Therefore, the effects of sufficiently slow changes in $v_{24-out}$, such as any drift in source intensity, will occur proportionately in each such input signal. This prevents the introduction of a differential signal therebetween due to such slow changes in $v_{24-out}$ which would adversely affect the comparison of the signals by comparator 42. Otherwise, the reset means could possibly cause a reset even though $\phi_m$ does not approach or exceed $\pi$, thereby cutting off valid data on the rate of rotation in the gyroscope output signal.

If the magnitude of the input signal applied to the inverting input of comparator 42 during operation becomes less than the selected value of the reference level voltage, comparator 42 will rapidly provide an output voltage level shift of typically twelve volts at its output with a slew rate of approximately 50 volts per microsecond. This reset voltage shift is applied to the input of analog switch 50 connected across an integration capacitor, 52, between the output and inverting input of integrator 31. Application of the reset voltage shift will cause switch 50 to close, reaching an "on resistance" value of typically 30 ohms within approximately 100 nanoseconds. This will rapidly discharge integration capacitor 52 to force output signal $v_{31-out}$ of integrator 31 to a value near zero, and will do so before the bias modulation amplitude feedback control loop is driven to an erroneous but stable value for $\phi_{mo}$.

When $v_{31-out}$ is zero, integrator 31 and both variable gain amplifier 32 and generator 20' will together provide an amplifier output signal having an amplitude which leads phase modulator 19 to provide periodic phase changes at frequency $\omega_g$ with an amplitude that is a fraction of the desired value $\phi_{mo}$. Thus, optical phase modulator 19 will continue to provide bias phase modulation, but with a phase shift amplitude $\phi_m$ less than a value giving a stable loop operating point, and so the bias feedback loop will force $\phi_m$ back to the desired, smallest value for $\phi_{mo}$ (less than $\pi$) after the disturbance ends. During the disturbance, the reset means will continue to reset the feedback loop operating point by discharging capacitor 52 and keeping that capacitor shunted by switch 50 for approximately 25 percent of each reset period set by the second harmonic of the bias modulation frequency. Although not shown, the reset means will also provide an indication signal during a reset of the feedback loop indicating that the data supplied representing the rotation rate is invalid.

The value of the reference level voltage is set by the output signal of voltage divider 48, $v_{48-out}$. If the value of the filter 46 output signal, $v_{46-out}$, during operation becomes less than the value of the reference level voltage, the reset means will reset the voltage value on capacitor 52 serving as an error memory in the feedback loop to thereby reset the loop operating point.

The selected value of the reference level voltage is derived from a range of possible trip level voltages for the reset means set by the operating needs of the optical subsystem. The lowest value of that range must be high enough so that the reset means will reset the feedback loop operating point before $\phi_m$ attains a value which would lead to a stable but unwanted operating point. Oppositely, the highest value of the range must be low enough so that the reset means will not reset the feedback loop operating point when $\phi_m$ is at or near $\phi_{mo}$, and $\phi_R$ is within its specified range.

The lower trip level value specifying the above range is determined by finding the corresponding lowest minimum value of the photodiode output photocurrent, $i_{PD13}$, and the associated value of $\phi_m$, ignoring any contribution from $\phi_R$ to be certain that too great an amplitude for $\phi_m$ will by itself be sufficient to cause a reset of the feedback loop operating point. The value of $i_{PD13}$ is represented by the equation $$i_{PD13} = \frac{I_o}{2}[1 + \cos(\phi_R + \phi_m \cos\omega_g t)]$$

as indicated above insofar as the optical subsystem signal output is concerned. Examination of this equation shows that $i_{PD13}$ has a lowest minimum value of zero and that, for a zero value of $\phi_R$, if $\phi_m$ reaches a value of $\pi$, $i_{PD13}$ reaches a value of zero. Therefore, if the trip level at the output of voltage divider 48 has a value corresponding to $i_{PD13}$ being greater than zero, $\phi_m$ cannot reach a value greater than $\pi$ without the reset means causing a reset of the feedback loop operating point. This prevents the feedback loop from attaining a stable but unwanted operating point.

The upper trip level value specifying the above range is determined by finding the corresponding minimum value of $i_{PD13}$ when $\phi_R$ is at the highest value within its specified range and $\phi_m$ is at its desired value. Analysis of the extrema of the above equation also shows that the minimum value of $i_{PD13}$ is represented by the equation $$i_{PD13min} = \frac{I_o}{2}[1 + \cos(|\phi_R| + \phi_m)].$$

In the feedback arrangement of the system described above, $\phi_m$ is typically desired to be less than 2.0 radians and a typical maximum rotation rate to be measured results in $\phi_R$ being specified to be at or less than 0.6 radians. Substituting these values into this last equation provides the result that the higher trip level limit is a value corresponding to $i_{PD13}$ having a value of $(0.07)I_o$. These two limit values found for $i_{PD13}$ must be multiplied by the various gain constants characterizing the electronic systems between the output current of photodiode 13 and the output voltage of voltage divider 48 to give the lower and upper trip value limits on the range thereof.

Determining the actual lower and upper trip level voltage values requires taking into account additional considerations such as offset voltages and noise in the photodiode signal and the signal processing subsystems acting thereon in providing signals to the reset subsystem. Compensating for these physical limitations requires that the lower and upper trip level voltage limits be altered sufficiently so that the values of $v_{46-out}$ which also contains the noise and the offsets, other than those due to divider 48 and the differences between filters 44 and 46, are properly positioned with respect to the range of possible trip values. The reference voltage is selected in the resulting range of values between the upper and lower trip value limits.

Figure 6:
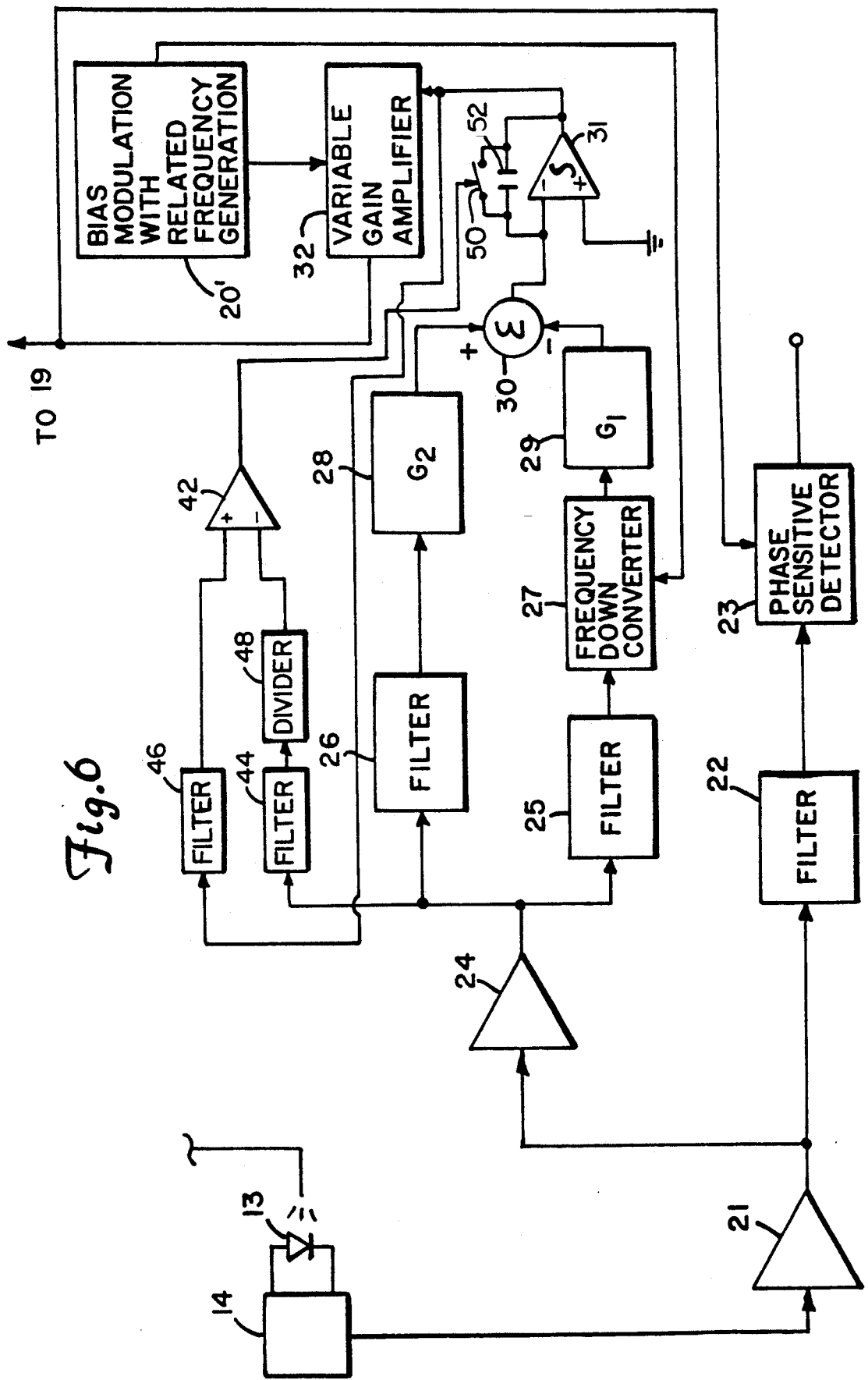
FIG. 6 shows a mixed block and circuit schematic diagram embodying the present invention which can be substituted for a portion of the diagram of FIG. 1.

A first alternative embodiment of the reset means of the present invention is shown in FIG. 6. This reset means is similar to the reset means described above except that the signal provided at the input of filter 46 is the output signal of integrator 31 instead of the output signal of amplifier 24. The output signal of filter 46 is supplied to the noninverting input of comparator 42. In addition, resistive voltage divider 48 will provide a selected reference level voltage, typically different from that in the reset means described above in being chosen to be suitable with the characteristics of the integrator output signal, and supply it to the inverting input of comparator 42. The output signal of integrator 31 is indicative of the magnitude of deviation of $\phi_m$ from $\phi_{mo}$. If the value of this signal is greater than the value of the predetermined reference level voltage, the reset means will reset the feedback loop operating point in the same manner as in the reset means described above.

Figure 7:
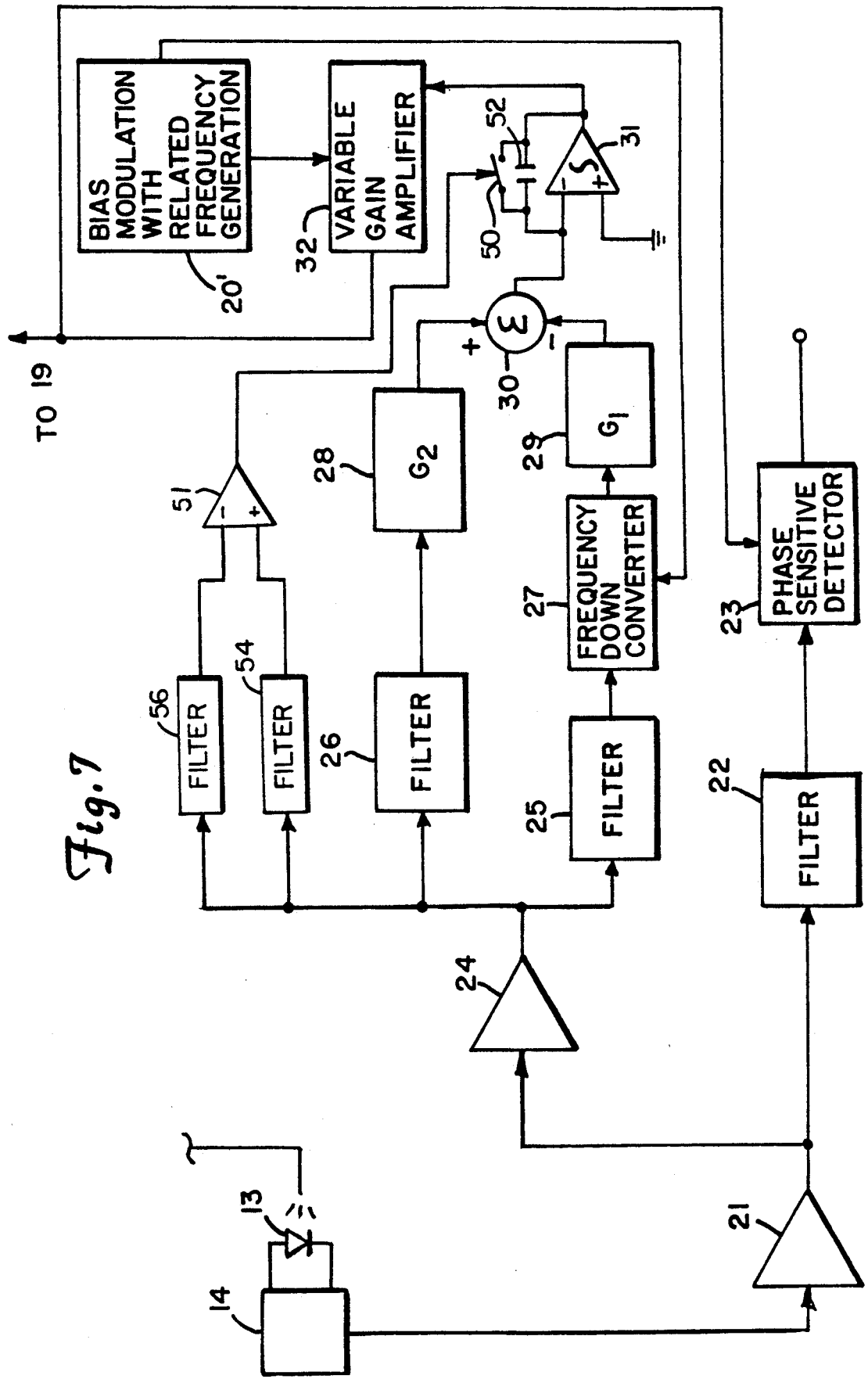
FIG. 7 shows a mixed block and circuit schematic diagram embodying the present invention which can be substituted for a portion of the diagram of FIG. 1.

In a second alternative embodiment, shown in FIG. 7, the signal at the output of amplifier 24 is concurrently supplied to electrical signal filters 54 and 56. Filter 56 is a high-pass filter with a cutoff frequency value below modulation frequency $\omega_g$ of bias modulation signal generator 20'. Filter 56 is used to provide the inverting input of comparator 51 with the components of photodetector output signal $v_{24-out}$ containing frequencies with values of $\omega_g$ or its harmonics. Filter 54 is a low-pass filter, also having a cutoff frequency value below $\omega_g$. Filter 54 is used to provide the noninverting input of comparator 51 with the component of the photodetector output signal which does not have any significant dependence on $\omega_g$ or its harmonics.

For small values of $\phi_R$, when $\phi_m$ reaches a value of approximately 2.45 radians, the signals at the inverting and noninverting inputs of comparator 51 will be equal in value. This results in a reset voltage shift of typically twelve volts being provided at the output of comparator 51. The signal at the output of comparator 51 is applied to analog switch 50 across integration capacitor 52 which resets the feedback loop operating point in the same manner as in the first embodiment.

Figure 8:
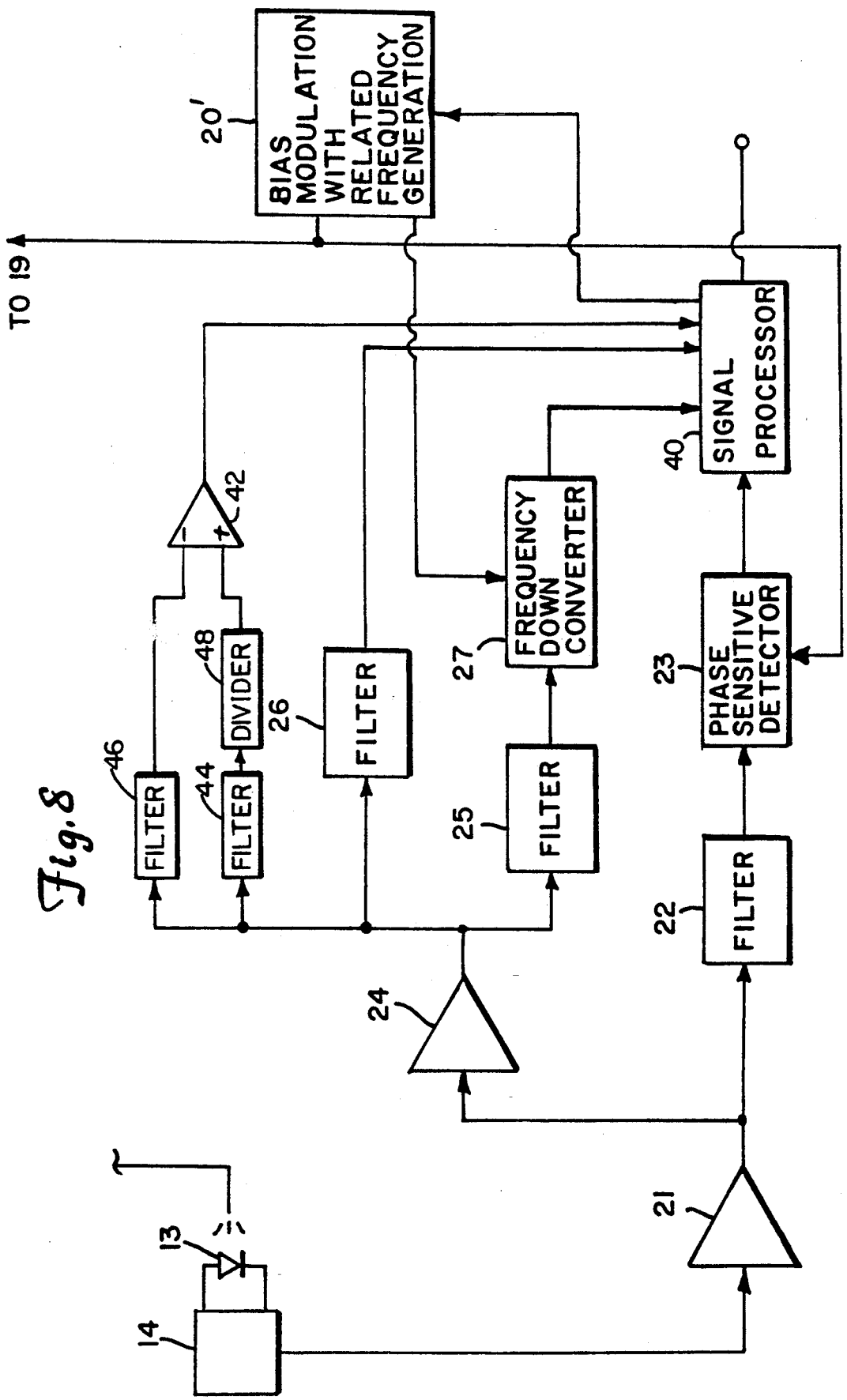
FIG. 8 shows a mixed block and circuit schematic diagram embodying the present invention which can be substituted for a portion of the diagram of FIG. 1.

In a third alternative embodiment, shown in FIG. 8, the reset means is similar to that described in the first embodiment except that the output signal of comparator 42 is applied to the input of signal processor 40 of FIG. 3. Signal processor 40, upon receiving an indication of a reset voltage shift, will interrupt its current operation to prevent the determination of an erroneous but stable value for $\phi_{mo}$. After the disturbance has ended, signal processor 40 will resume its calculations and again direct generator 20' to provide a generator output amplitude to direct phase modulator 19 to have amplitude $\phi_m$ equal to the desired value $\phi_{mo}$.

Although the present invention has been described with reference to preferred embodiments, workers skilled in the art will recognize that changes may be made in form and detail without departing from the spirit and scope of the invention.

What is claimed is:

1. A bias modulation amplitude monitoring means for a rotation sensor capable of sensing rotation thereof about an axis of a coiled optical fiber to provide a rotation sensor output signal indicative of such rotation through having a pair of electromagnetic waves propagating in said coiled optical fiber in opposite directions and along other optical path portions to reach and leave said coiled optical fiber as they travel along an optical path to both impinge on a photodetector means with a phase difference relationship therebetween providing a basis for a resulting photodetector means output signal at an output thereof, and with a bias optical phase modulator positioned in a said optical path portion capable of phase modulating any such electromagnetic waves passing therethrough in propagating along said optical path so as to provide a varying phase difference between such electromagnetic waves of a selectable frequency and a selectable amplitude but with said amplitude subject to variation, said bias modulation amplitude monitoring means comprising:

a first photodetector output signal component determination means having an output and having an input which is electrically connected to said photodetector means output, said first photodetector output signal component determination means being capable of providing at its output an indication of that magnitude occurring in a first component of said photodetector means output signal selected therefrom by its frequency content;

a second photodetector output signal component determination means having an output and having an input which is electrically connected to said photodetector means output, said second photodetector output signal component determination means being capable of providing an indication of that magnitude occurring in a second component of said photodetector means output signal selected therefrom by its frequency content;

a photodetector output signal component relationship determination means having a pair of inputs each of which is electrically connected to one of said first and second photodetector output signal component determination means outputs, said photodetector output signal component relationship determination means being capable of adjusting said photodetector means output signal such that said rotation sensor output signal has a selected value in a range of values for a selected rate of rotation of said rotation sensor about said axis, and of correcting deviations therefrom due to said phase modulation amplitude variation, based on relative values of magnitudes of said photodetector means first and second output signal components; and a reset means having an input which is electrically connected to a selected one of said first and second photodetector output signal component determination means, and said photodetector output signal component relationship determination means, and having an output which is electrically connected to said photodetector output signal component relationship determination means, said reset means being capable of forcing said photodetector output signal component relationship determination means to adjust said photodetector means output signal such that said varying phase difference amplitude is reduced to a value below a first predetermined value if, immediately prior to said reduction, a selected second, larger, predetermined value was exceeded by said varying phase difference amplitude.

2. The apparatus of claim 1 wherein said reset means comprises a decision means, said decision means having an output which is electrically connected to said photodetector output signal component relationship determination means and having both a first and a second input which are electrically connected to said first and second photodetector output signal component determination means, said decision means being capable of providing a reset voltage shift at its output if that magnitude of a signal at its second input is less than a reference level voltage.

3. The apparatus of claim 2 wherein said reference level voltage is provided to said first input of said decision means by said photodetector means output.

4. The apparatus of claim 2 wherein said signal at said second input of said decision means is said photodetector means output signal.

5. The apparatus of claim 2 wherein provision of said reset voltage at said output of said decision means forces said photodetector output signal component determination means to adjust said photodetector means output signal such that said varying phase difference amplitude is reduced to a value below said first predetermined value.

6. The apparatus of claim 1 wherein said reset means comprises a decision means, said decision means having an output which is electrically connected to said photodetector output signal component relationship determination means and having a first input which is electrically connected to said first and second photodetector output signal component determination means and a second input which is electrically connected to said photodetector output signal component relationship determination means, said decision means being capable of providing a reset voltage shift at its output if that magnitude of a signal at its second input is greater than a reference level voltage.

7. The apparatus of claim 6 wherein said reference level voltage is provided to said first input of said decision means by said photodetector means output.

8. The apparatus of claim 6 wherein provision of said reset voltage at said output of said decision means forces said photodetector output signal component determination means to adjust said photodetector means output signal such that said varying phase difference amplitude is reduced to a value below said first predetermined value.

9. The apparatus of claim 1 wherein said reset means comprises a decision means, said decision means having an output which is electrically connected to said photodetector output signal component relationship determination means and having both a first and a second input that are electrically connected to said first and second photodetector output signal component determination means, said decision means being capable of providing a reset voltage shift at its output if that magnitude of a signal at its second input is equal to that magnitude of a signal at its first input.

10. The apparatus of claim 9, wherein said signal at said first input of said decision means is one component of said photodetector means output signal and said signal at said second input of said decision means comprises those remaining components of said photodetector means output signal.

11. The apparatus of claim 9 wherein provision of said reset voltage at said output of said decision means forces said photodetector output signal component determination means to adjust said photodetector means output signal such that said varying phase difference amplitude is reduced to a value below said first predetermined value.

* * * * *